United States Patent [19]

McWhorter et al.

[11] 3,708,451

[45] Jan. 2, 1973

[54] METHOD AND COMPOSITION FOR PREPARING GRAPHITE PRODUCTS

[75] Inventors: William C. McWhorter, Norman L. Dykes, both of Oak Ridge, Tenn.

[73] Assignee: The United States of America as represented by the United States Atomic Energy Commission

[22] Filed: Sept. 8, 1971

[21] Appl. No.: 178,798

[52] U.S. Cl. ............... 260/29.8, 106/279, 106/284, 260/37 R, 264/347, 264/29, 264/DIG. 19, 423/448, 423/449
[51] Int. Cl. ..................... C08g 51/34, C01b 31/07
[58] Field of Search .......... 106/193 J, 278, 279, 284; 260/29.8, 37 R

[56] References Cited

UNITED STATES PATENTS

| 2,519,442 | 8/1950 | Delorme | 260/29.8 |
|---|---|---|---|
| 1,971,398 | 8/1934 | Fausten | 106/193 J |
| 2,109,593 | 3/1938 | Macht | 260/29.8 |
| 2,137,301 | 11/1938 | Banigan | 106/193 J |
| 1,508,504 | 9/1924 | Brown | 106/193 J |
| 3,487,043 | 12/1969 | Grudus | 260/88.5 |

Primary Examiner—Morris Liebman
Assistant Examiner—P. R. Michl
Attorney—Roland A. Anderson

[57] ABSTRACT

Dense graphite products having an open porosity of less than one per cent are prepared by employing an improved graphitizable mixture consisting essentially of a carbonaceous filler, a carbonizable resin binder, and a small quantity of dissolved camphor. This mixture can be readily formed into products of the desired configuration by extrusion, molding, slip casting, or spraying.

3 Claims, No Drawings

METHOD AND COMPOSITION FOR PREPARING GRAPHITE PRODUCTS

Graphite products are conventionally formed by employing a graphitizable mixture such as graphite or carbon particles and a binder of pitch or another suitable resin with this mixture being formed into the desired configuration by an extrusion or molding operation and then cured and heat treated for converting the carbonaceous material to graphite. In using graphite-producing mixtures as previously known the graphite products typically had about 5 to 15 percent open porosity which presents more surface area to increase oxidation sensitivity and which, in some instances, presents excessive permeability to gases and fluids so as to significantly detract from the usefulness of the graphite. Also, in nuclear reactor applications, such as molten salt reactors, fission products tend to collect in the pores of the graphite and thereby poison the reactor.

Another drawback suffered by the compositions previously employed in the preparation of graphite products is due to the difficulty in forming the desired product configuration by conventional shaping techniques such as extrusion, molding, or slip casting. For example, when forming the product by extrusion the quantity of binder in the mixture can be varied only within a relatively narrow range of about 20 to 30 weight percent of the carbonaceous filler. If less binder is used, excessive force must be employed to extrude the mixture through the extrusion die which causes abnormal expansion and attendant cracking of the formed article as it leaves the die. Also, less than the aforementioned quantity of binder causes insufficient particle to particle bonding, which results in a formed article having poor structural integrity. On the other hand, an amount of binder greater than that in the above range typically results in an excessive amount of binder between particles whereby the shrinkage in the binder during graphitization results in cracking and a poor particle to particle bond. Further, with a binder content above about 30 weight percent of the filler the escaping volatiles released from the binder during carbonization and graphitization create an excessively porous product having physical properties undesirable for many applications. These shortcomings associated with binder quantities greater than about 30 weight percent of the filler are also prevalent when attempts are made to form satisfactory products by molding and slip casting.

When the viscosity of the graphite-producing mixture is reduced by the addition of a solvent to facilitate the forming of products by slip casting, the binder migrates toward the surface of the formed article as the solvent evaporates. This results in an article having a porous binder with weak structural characteristics which severely limit the utility of the formed article.

Accordingly, it is the primary objective or aim of the present invention to obviate or substantially minimize the aforementioned problems and shortcomings suffered by the prior art graphite-producing mixtures by employing an improved composition which readily lends itself to the fabrication of dense, low-porosity carbonaceous products, i.e., carbon or graphite, in complex configurations by extrusion, molding, slip casting, and spray forming. Also, graphite dies with high quality reliefs therein may be readily formed from this improved composition. This composition consists essentially of a carbonaceous filler material in particulate or fibrous form or a mixture thereof, a resin binder, and dissolved camphor in a quantity corresponding to less than 1 weight percent of the mixture. A unique feature provided by this composition is the ability to shrink without deleterious cracking when subjected to heat treatment.

Other and further objects of the invention will be obvious upon an understanding of the illustrative method and composition about to be described, or will be indicated in the appended claims, and various advantages not referred to herein will occur to one skilled in the art upon employment of the invention in practice.

Graphite products having an open porosity of less than one per cent are readily fabricated by employing the improved graphite-producing composition of the present invention. This mixture corresponds generally to that previously employed in the manufacture of graphite products but differs therefrom by the addition of camphor and the use of a greater quantity of binder material than previously useable. Generally, this composition comprises a filler material selected from high purity graphite powder in a size range of about 20 to 500 microns, chopped carbon or graphite fibers of a diameter of about 2 microns and a length of about 10 mils, or a mixture of the graphite powder and fibers, camphor, and a carbonizable resin binder which provides a substantial yield of carbon upon the carbonization thereof. If desired, graphite powder having a particle size less than about 5 microns may be used for the formation of carbonaceous products with very smooth surfaces. Resins such as partially polymerized furfuryl alcohol, pitch and furans may be satisfactory for use in the composition of the present invention. If desired, the polymerization of the binder may be aided by employing a catalyst therefor as is well known in the art. The camphor is added to the composition by dissolving it in a suitable solvent therefor such as acetone, benzene or any other suitable solvent which is readily removable from the composition or, if desired, without dissolving. After forming the composition into a desired product configuration the composition may be heat treated to convert the resin to a carbonaceous state by employing any suitable well known carbonizing procedure. For example, the resin may be cured by heating the composition at a temperature of about 250°C. in an oxidizing atmosphere or vacuum and then heating the composition in an inert atmosphere such as argon to a temperature of about 1,000° to 3,000°C. for converting the resin to the desired carbonaceous state.

The use of camphor in the composition is necessary to the preparation of a graphite-producing composition having the desired properties. However, while the exact function of the camphor is not fully understood, it is believed that it vastly improves the wetting of the graphite particles or fibers by the resin and also forms a micropore off-gassing system which provides for uniform decomposition pyrolysis and shrinkage in such a manner as to inhibit stresses and cracks in the product. Apparently, at high processing temperatures, e.g., about 1,500°–3000°C., the pores close almost completely as evidenced by the low percentage of open porosity in graphite products which is less than 1 percent. The camphor apparently volatilizes from the composition at a temperature of about 207°C. so as to be virtually non-existent except, perhaps, for the carbon fraction of the camphor in the finished carbonaceous product. Further, the use of the camphor in the composition provides for the use of a larger proportion of binder in the composition so as to provide a relatively low viscosity mixture to accommodate the employment of more economical and simpler fabrication techniques, causes the formed body to be sufficiently flexible prior to curing the resin to permit the use of shaping configurations that would have heretofore cracked the formed body, provides a graphite product having a virtually impermeable surface, and promotes off-gassing for uniform shrinkage of the formed product without causing deleterious cracking and excessive porosity. In fact, the linear shrinkage is typically about 10 percent when processed to about 3,000°C. This extent of shrinkage is well in excess of that which will cause cracking to occur in previously known graphite fabrications. Also, the high degree of shrinkage permissible with the present invention provides another feature in that products with densities of about 1.9 gm/cc may be readily produced without employing resin impregnation techniques as heretofore required for such a high density.

The camphor is employed in the mixture in an amount corresponding to less than 1 weight percent of the carbonaceous filler material and binder and in most instances a camphor quantity corresponding to about 0.25 to 0.8 weight percent has been found to be adequate. Greater quantities of camphor may be employed but no significant improvement in the product is obtained.

As pointed out above the use of camphor in the composition allows a greater quantity of resin to be employed. For example, the resin content may be as high as 60 weight percent of the mixture but normally a resin content in the range of about 30 to 50 provides a composition of a sufficiently low viscosity so as to be formable by conventional shaping techniques including low pressure extrusion and slip casting.

In order to provide a more facile understanding of the present invention examples relating to the formation of graphite tubes by extrusion are set forth below.

EXAMPLE I

A mixture of 1,100 grams of graphite flour (less than 5-micron diameter), 1,000 grams of partially polymerized furfuryl alcohol, and 5.20 grams of camphor dissolved in 1,500 milliliters of acetone was blended for approximately 45 minutes until the acetone evaporated and the mixture formed into damp spheres having a diameter of about one-eighth of an inch. The damp spheres were then further blended to produce a damp mass which was extruded once prior to forming articles with it. After the first extrusion, the formulation was extruded to form flexible green tubes 0.5 inch in diameter and having a wall thickness of 0.20 inch. The green tubes were curved to form coils and knots to test their flexibility. The variously shaped tubes were cured for 60 hours in an inert atmosphere after the temperature had been slowly increased to 250°C. The cured tubes were structurally sound and had a density of 1.497 grams/cc. The cured tubes were graphitized in three separate temperature cycles. First, the tubes were partially carbonized to a density of 1.629 gm/cc by heating them to 850°C. over a 300-hour period in an inert atmosphere. Next, the tubes were heated at 2,300°C. over a 16-hour period in an inert atmosphere which provided the tubes with a density of 1.723 gm/cc. Finally, the tubes were provided with a density of 1.740 gm/cc by heating them to 3,000°C. over a 16-hour period in an inert atmosphere. Analytical data showed the finished tubes had a wall thickness of 0.17 inch and a diameter of 0.418 inch, a compressive strength of 11,875 psi, and an open porosity less than 1 percent.

EXAMPLE II

A mixture of 1,050 grams of graphite powder, 1000 grams of partially polymerized furfuryl alcohol, and 15.60 grams (0.76 weight percent) camphor was blended and twice extruded as described in Example I. The extrusion pressure was 31,830 psi. The tubes were heated to 250°C. in vacuum for 60 hours and resulted in a density of 1.69 grams/cc. The tubes were then heat treated at temperatures of 850°C., 2,300°C., and 3,000°C. as in Example I with the resulting densities of 1.79, 1.91 and 1.91 grams/cc, respectively. The tubes heat treated at 3,000°C. had a compressive strength of 13,848 psi.

The aforementioned example while relating to the formation of the product by extrusion is also relevant to the formation of products by molding, spray forming, and slip casting since the viscosity of the mixture is such that these forming procedures are readily useable. Also, the physical characteristics of the articles formed by these other fabrication techniques correspond closely to those provided by the extrusion procedure noted above.

It will be seen that the present invention relates to an improved graphite-producing composition which can be formed into the desired product configuration by employing shaping techniques previously found to be difficult to practice and also which provides graphite products of considerably less open porosity than previously obtainable. Another feature of the present invention is that the afore-described composition may be used as a cement for joining together carbonaceous bodies. As cement the composition is easily applied to the faying surfaces and can be applied in thicker layers than conventional carbon-to-carbon cements. Also, the cement provides a crack-free joint of low porosity.

What is claimed is:

1. In the art of manufacturing carbonaceous products in which mixtures of particulate carbonaceous materials and carbonizable resin binders are formed into the desired article configuration and heated in an inert atmosphere to graphitization temperatures, an improved composition for the manufacture of said products comprising a carbonaceous filler material, a carbonizable resin binder selected from the group consisting of partially polymerized furfuryl alcohol, pitch and furans and in a quantity corresponding to 30 to 60 weight percent of the composition, and camphor in a quantity corresponding to less than 1.0 weight percent of the composition.

2. The improved composition of claim 1, wherein the camphor is dissolved in a solvent therefor prior to being combined with the filler material and resin binder.

3. The improved composition of claim 2, wherein the filler material is at least one of graphite powder and graphite fibers.

* * * * *